UNITED STATES PATENT OFFICE.

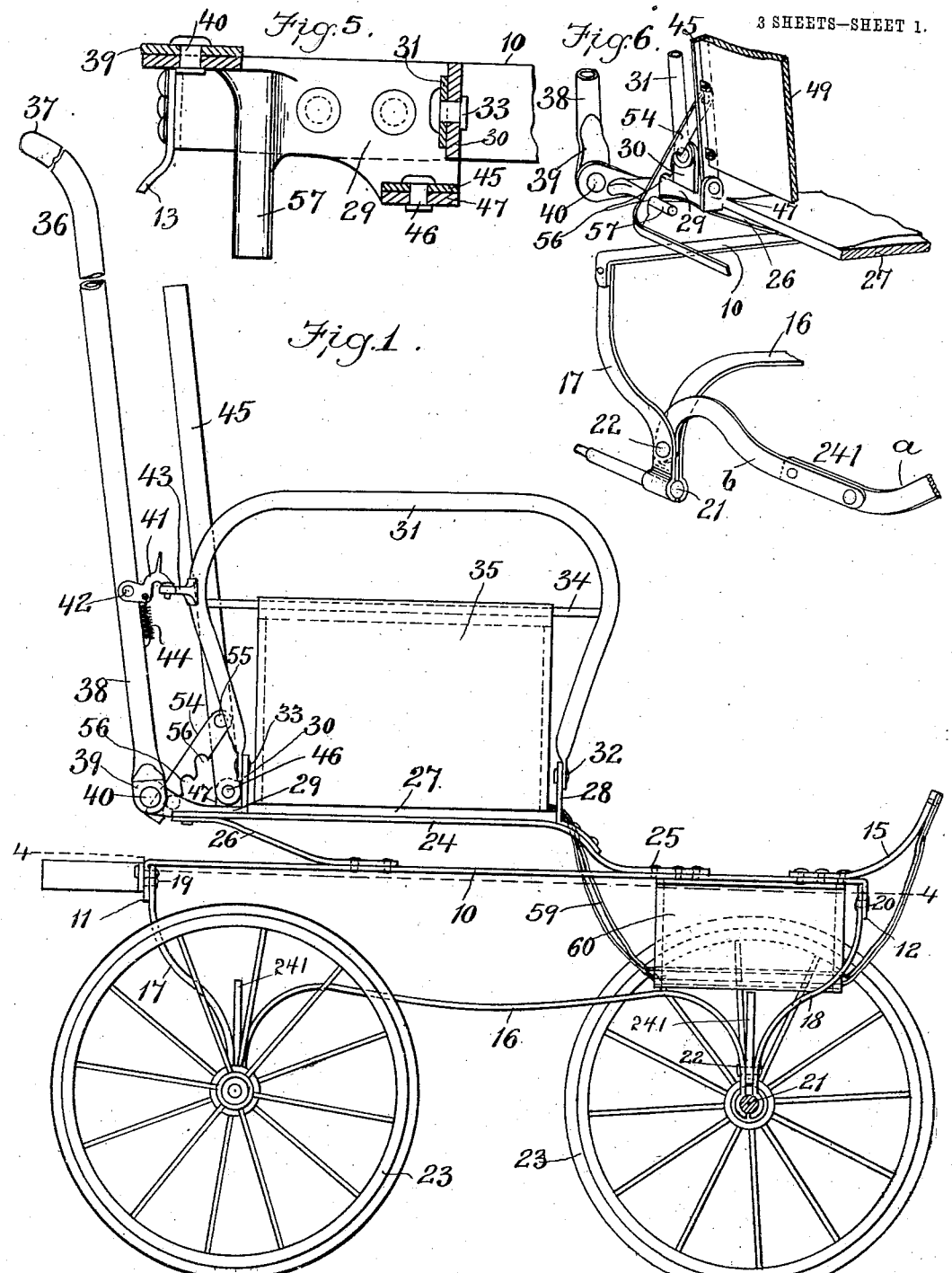

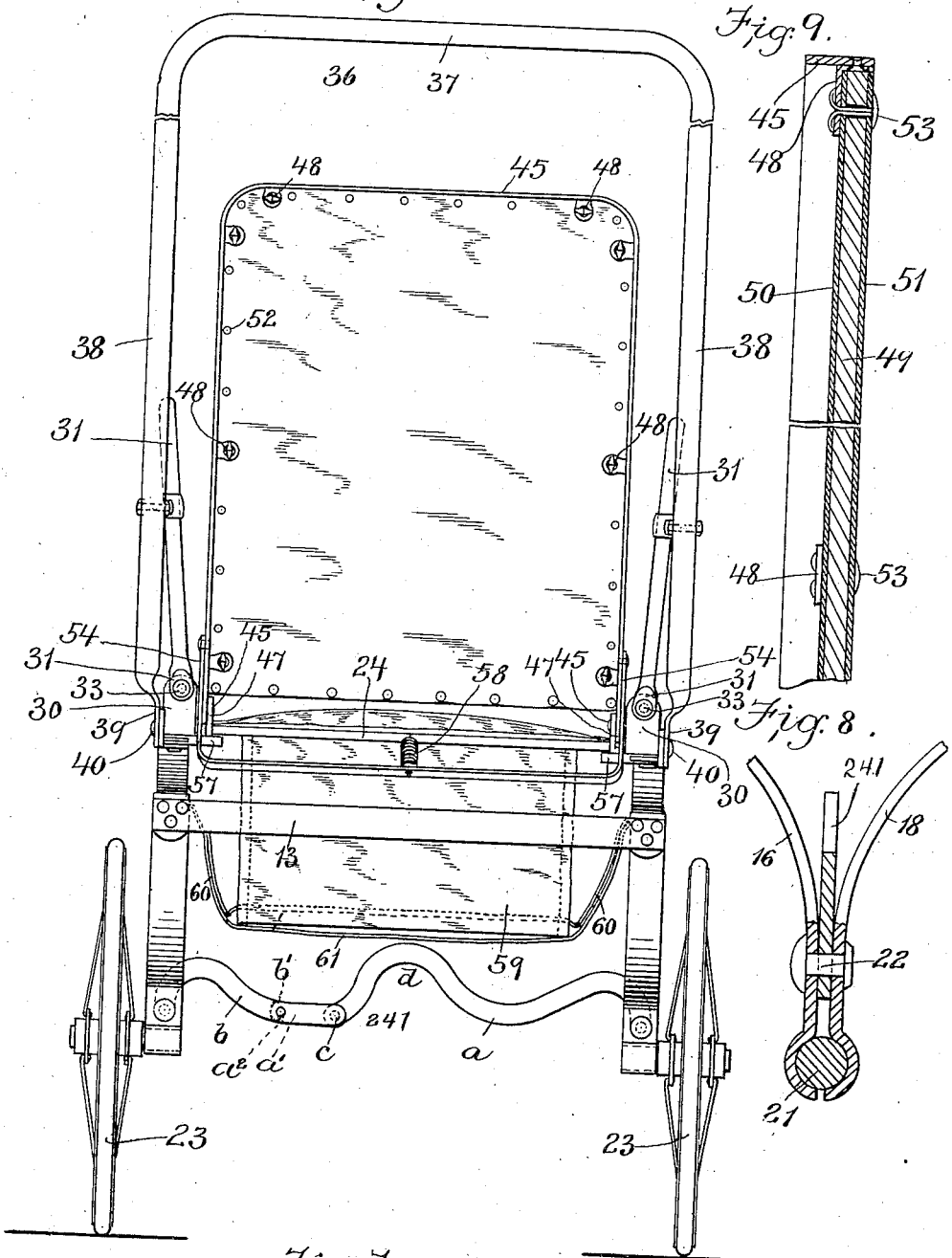

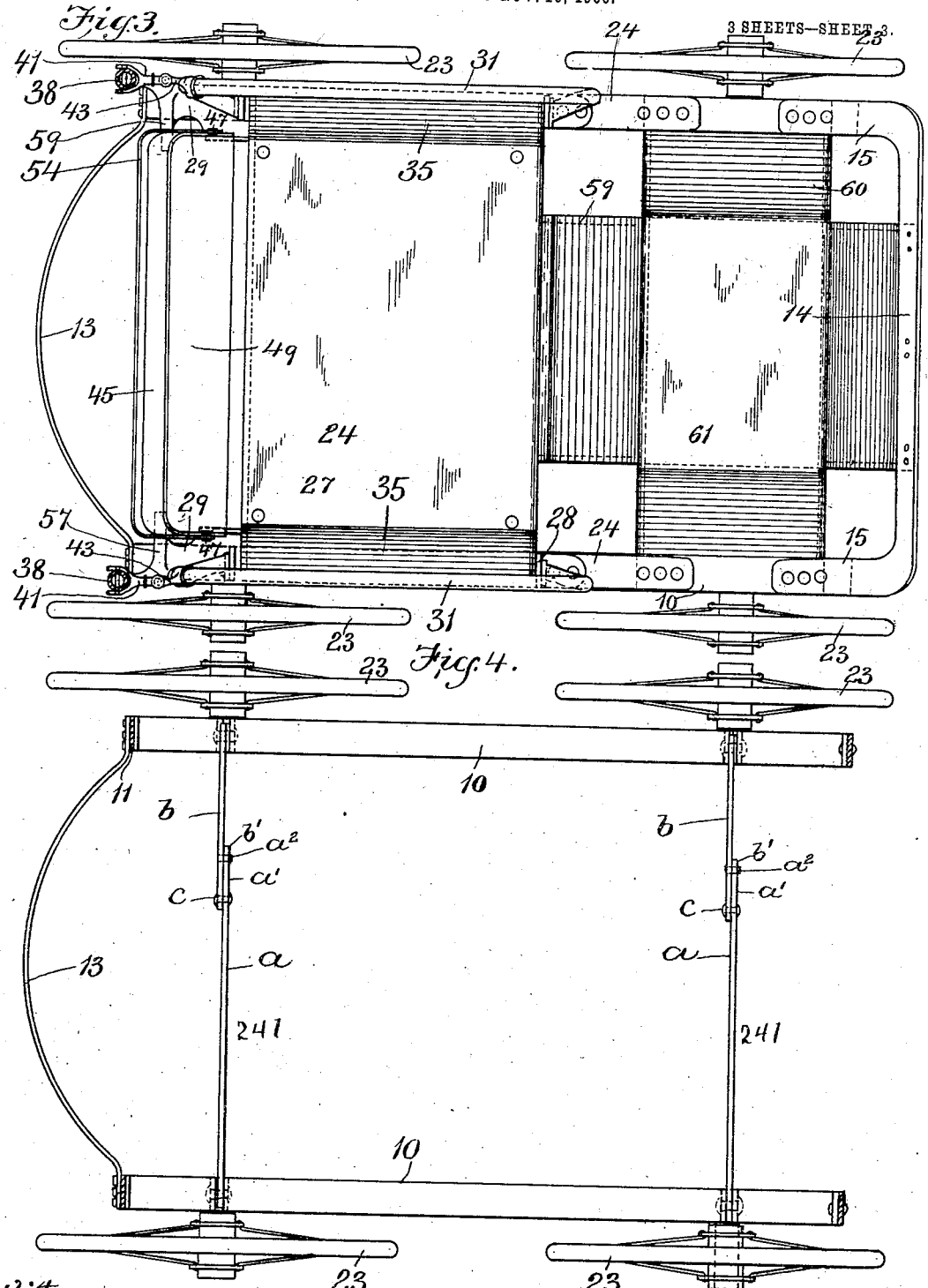

DAVID R. COLLIER, OF GARDNER, MASSACHUSETTS.

PERAMBULATOR.

No. 862,711.   Specification of Letters Patent.   Patented Aug. 6, 1907.

Application filed November 10, 1906. Serial No. 342,834.

*To all whom it may concern:*

Be it known that I, DAVID R. COLLIER, of Gardner, in the county of Worcester and State of Massachusetts, have invented certain new and useful Improvements in Perambulators, of which the following is a specification.

This invention has relation to folding perambulators, and has for its general object the provision of a light perambulator which may be folded into a small compass so that it may be carried with facility. Its further object is to provide improvements in perambulators of the character referred to by which they may be simplified in construction, by which the parts may be securely locked in their operative positions, and by which the seat may be supported resiliently so as to save the occupant from shocks or jars.

Referring to the drawings,—Figure 1 represents in side elevation a perambulator embodying the invention. Fig. 2 represents a rear end elevation of the same. Fig. 3 represents a plan view with the handles in section. Fig. 4 represents a section taken on line 4—4 of Fig. 1 with the foot-rest omitted. Fig. 5 represents in detail the part or casting, to which are pivoted the back and sides of the seat and the handles. Fig. 6 represents a perspective view of the side of the carriage at the back of the seat. Fig. 7 shows one of the jointed braces connecting the wheel frame. Fig. 8 represents an enlarged section through one of the axles and the bars constituting the wheel frame. Fig. 9 represents a section through the back of the seat.

Briefly, the perambulator may be stated to consist of a main frame, hinged wheel frames, a seat yieldingly supported on the main frame, hinged sides and a hinged back for the seat, and a hinged handle the bars of which are adapted to be locked to the sides of the seat.

The main frame consists of side bars 10 10 which are made of flat metal strips arranged horizontally with their ends turned downward at 11 and 12. At the rear end, these side bars are connected by a bowed or curved cross-piece 13 likewise formed of flat metallic strips but arranged vertically and having its ends riveted or otherwise secured to the downturned ends 11 of the side bars 10. The said side bars 10 10 are also connected at their front ends by a cross-bar 14, having bent ends riveted or otherwise secured upon the top of said side bars 10. The ends 15 of the front cross-bar are bent upwardly as shown, so that said cross-bar 14 constitutes as it were a dasher.

The wheel frames consist of flat metallic bars 16, 17, and 18. These are curved as illustrated in Fig. 1, the upper ends of the bars 17 and 18 being pivoted by studs 19 and 20 to the downwardly turned ends 11 and 12 of the side bars of the main frame. Each of the bars 17 and 18 forms an ogee curve so that their ends are brought nearer together than the ends 11 and 12. The bar 16 serves to connect the bars 17 and 18 and its ends are downwardly curved as illustrated. Each of the wheel frames may as a whole be swung into substantial parallelism with the plane of the main frame or else may be swung downwardly into the position shown in Fig. 2. The ends of the bars 16, 17 and 18 are brought substantially into parallelism as illustrated in Fig. 1, and they are curved in a semi-circular form so as to form a clamp to firmly engage between them stud axles 21, see Fig. 8. The ends of the said bars are secured together by studs or rivets 22 which rigidly secure together the bars which constitute each wheel frame and the axles which are clamped thereby.

Instead of employing three bars to form the wheel frame, I have contemplated using a single bar which is properly bent into shape. The wheels 23, of any suitable design, are journaled upon the stud axles and are held in place by the usual nuts. The wheel frames are connected by folding or toggle braces indicated at 241 and permanently pivoted thereto. Each brace consists of two toggle members $a$ and $b$ which are pivoted together by a stud or rivet $c$, see Figs. 2 and 7. The member $a$ has an extension beyond the stud as at $a'$, and it is slotted as at $a^2$ to receive a pin $b'$ on the member $b$. When the wheel frames are vertical or in their operative positions, the pivot $c$ is in alinement with the pivots which connect the brace with the wheel frames so that the wheel frames are locked against inward movement. The extension $a'$ and the pin $a^2$ prevent the members $a$ and $b$ from dropping downward at their point of connection. Each brace, viewed as a whole, is serpentine in shape; that is to say, it has downwardly curved ends which are pivoted to the studs 22 and an upwardly curved middle portion $d$. The ends of the brace therefore lie between the parallel ends of the bars of the wheel frames and said braces extend transversely of the perambulator in the vertical planes of the axles so that the lateral strain of the axles is borne by the cross-braces and not by the wheel frames. When the wheel frames are swung inward, the curved portions of the braces permit the wheels to be folded beneath the main frame close together and in close proximity to the plane of the frame. In practice, to fold the wheel frames, the braces $a$ are first forced upwardly at their pivotal connections $c$, the right-hand wheel frame in Fig. 2 is then bent so as to lie substantially parallel to the plane of the main frame, and then the left-hand wheel frame is folded inwardly so that the wheels carried thereby overlap and lie flat upon the other wheels.

The seat comprises a frame formed of flat metallic bars 24, which are parallel with but raised above the side bars 10 of the frame. The front ends of the bars 24 are curved downwardly so as to rest upon said bars 10 to which they are secured by rivets or fastenings 25. The rear ends of said bars 24 are yieldingly supported by bars 26, the front of which are attached to the bars 10 and the rear ends to the said bars 24 of the seat frame. The seat 27 is secured to the said bars 24 and it may be formed of wood suitably cushioned and upholstered.

Secured to the front ends of the side bars 24 of the seat frame are upstanding angle pieces 28, and to the rear ends of said side bars are secured brackets 29. Each bracket 29 has an upstanding lug or ear 30 parallel with the upstanding portion with the corresponding angle piece 28. The sides of the seat consist of tubes 31, which are bent substantially into U-form with their ends flattened. The ends of each of the sides are pivoted by studs 32 33 to the angle piece 28 and the lug or ear 30. Each side is provided with a longitudinal side bar 34 to which is secured a sheet of leather or other suitable material 35, the lower end of which is attached to the seat 27. Each side is of such height that they may be folded or swung downwardly so as to lie substantially in parallelism with each other and with the seat. By forming the sides of the seat of tubes, they are consequently light in weight, yet at the same time strong and rigid.

The handle, indicated as a whole at 36, consists of an end bar 37 and curved side bars 38 38, and it is formed of a tube bent substantially into U-form with the ends flattened as illustrated at 39 in Fig. 2. These flattened ends are pivoted by studs 40 to the ends of the brackets 29, see Fig. 5. The distance between the side bars 38 of the handle is greater than the distance between the outer edges of the side bars 10 of the frame, so that, when the handle is swung downward into substantially horizontal position, it may swing by if necessary said side bars 10 of the frame.

In order that the handle and the sides of the seat may be held and locked in their operative positions, I provide each of the side bars 38 with a hooked latch 41, pivoted at 42 thereto and adapted to have its hook enter an aperture in a lug 43 formed on or secured to the corresponding side 31. A spring 44, connected to said hooked latch, holds it in engagement with the corresponding lock member 43. When the sides and the handle are locked together, the sides converge downwardly as illustrated in Fig. 2.

The back of the seat consists of a flat metallic bar 45 which is bent substantially into U-form or to form three sides of a rectangle and its ends are pivoted by studs 46 to upstanding ears 47 on the brackets 29. At intervals there are riveted or otherwise secured to the bar or frame 45 angular ears or lugs 48, which serve as means for attaching to said frame a board 49 which fills the space inclosed by the frame. This back board is upholstered or covered with leather or other material as indicated at 50 51, secured at their edges by tacks as at 52. Cotter pins or other suitable fastenings, as indicated at 53, are passed through apertures in the back board and in the ears or lugs 48. It will be observed that the projecting portions of the lugs 48 are in the rear of the board so as to withstand any strain or pressure which the occupant of the carriage may put thereon. By reason of its pivotal connection to the seat frame, the back may be swung down so as to lie flat upon the seat, the axes of its pivots being located in a horizontal plane between the plane of the seat and the plane of the pivots 32 33 for the sides.

In folding the perambulator, the back is first swung downwardly so as to rest upon the seat, and the sides are then swung inward so as to rest upon the back, one of said sides being superimposed upon the other. In order to hold the back at any one of several positions and at any desired inclination, there is pivoted by studs 55 to the back frame 45 a yoke 54. The side bars 70 of the yoke are formed with notches 56 for engagement with inwardly projecting pins or abutments 57 on the brackets 29. To maintain in position the yoke or pivoted supporting strut for the back, as it may be termed, I utilize a spring 58, see Fig. 2, one end of which is attached to the cross-bar of the yoke and the other end of which is attached to the seat.

As a convenient foot-rest, I employ two transversely arranged strips of fabric as indicated at 59 and 60 respectively. These strips may be formed in one or more layers for strength. The strip 59 extends from the front edge of the seat to which it is secured to the end bar 14 of the main frame, and the strip 60 extends between the side bars 10 10 of the main frame to which it is attached. Each strip is considerably longer than the space between the parts to which it is attached so that they sag downwardly as illustrated in Fig. 1. Where they cross each other, they are provided with a rectangular body portion of unyielding material such as an oblong piece of wood 61, see Fig. 2, heavy leather or the like. Preferably each strip is formed in two layers as shown in Fig. 2, and the stiffening material is interposed between an upper and an under layer of each of the fabrics 59 and 60. The rigid body or foot support is thus flexibly connected to the perambulator so that, when the wheel frames are folded into their inactive positions, the foot-rest will move upwardly so as to lie substantially in the plane of the main frame. When, however, the perambulator is in its operative condition, the foot-rest drops to a plane considerably below the planes of the seat and the main frame to insure the comfort of the occupant.

By connecting the longitudinal strip of fabric to the seat and to the front end bar of the main frame, the foot rest is strengthened and a convenient receptacle is afforded for cushions and coverings for the feet and legs of the occupant.

Having thus explained the nature of the invention and described a way of constructing and using the same, although without attempting to set forth all of the forms in which it may be made, or all of the modes of its use, I declare that what I claim is:—

1. In a perambulator of the character described, a main frame comprising flat metallic side bars arranged horizontally, a rear end bar arranged vertically and having its ends secured to the rear ends of the side bars, and a front end bar of substantial U-shape having its end portions secured upon the side bars, and curving upwardly therefrom so that the front portion is at an inclination to the horizontal.

2. In a perambulator of the character described, a main frame having parallel side bars with downwardly projecting ears or lugs, and wheel frames pivoted to said ears or lugs, each wheel frame comprising curved end portions and an intermediate connecting portion.

3. In a perambulator of the character described, a main frame having parallel side bars with downwardly projecting ears or lugs, wheel frames pivoted to said ears or lugs, each wheel frame comprising curved end portions and an intermediate connecting portion, said end and intermediate portions of each wheel frame being formed to provide sockets, and wheel axles secured in said sockets.

4. In a perambulator of the character described, the combination with a main frame having flat side bars with down turned ends, of wheel frames formed of flat bars pivoted at their ends to the ends of the said side bars and braces connecting said wheel frames and comprising two pivoted sections pivoted at their ends to the wheel frames.

5. In a perambulator of the character described the combination with a main frame having side bars, of wheel frames each pivoted at its ends to the ends of the side bars, each wheel frame comprising downwardly converging curved end bars, and a curved intermediate bar, the adjacent ends of said bars forming clamping members, and stud axles secured in position by said clamping members.

6. In a perambulator of the character described, the combination with a main frame having side bars, of wheel frames each pivoted at its ends to the ends of the side bars, each wheel frame comprising downwardly converging curved end bars and a curved intermediate bar, the adjacent ends of said bars forming clamp members, stud axles secured by said clamp members, and transverse toggle braces having their outer ends pivoted between the said adjacent ends of said bars of the wheel frames.

7. In a perambulator of the character described, the combination with the main frame, the wheel frames pivoted thereto, and wheels journaled on said wheel frames, of jointed toggle braces permanently pivoted to and connecting said wheel frames.

8. In a perambulator of the character described, the combination with the main frame, the wheel frames pivoted thereto, and wheels journaled on said wheel frames, of toggle braces connecting said wheel frames, each of said toggle braces having downwardly turned ends and an upwardly curved middle portion.

9. In a perambulator of the character described, the combination with the main frame, the wheel frames pivoted thereto, and wheels journaled on said wheel frames, of toggle braces connecting said wheel frames, each of said toggle braces comprising two sections pivoted at their adjacent ends, one of said sections having a stop and the other an extension for engaging said stop.

10. In a folding perambulator of the character described, a main frame, folding wheel frames, a seat, side bars supporting said seat and having their front ends attached to the main frame, said seat being elevated above said main frame, and being yieldingly supported by said side bars.

11. In a folding perambulator of the character described, a main frame, folding wheel frames, a seat, side bars supporting said seat and having their front ends attached to the main frame, said seat being elevated above said main frame and being yieldingly supported by said side bars, and springs interposed between the rear ends of said side bars and said main frame.

12. In a folding perambulator of the character described, a main frame, folding wheel frames, a seat supported on the main frame, and sides for the seat, each side comprising a tube bent into U-shape and having flattened ends, and longitudinally arranged pivots connecting the flattened ends of the said tubes to the seat.

In testimony whereof I have affixed my signature, in presence of two witnesses.

DAVID R. COLLIER.

Witnesses:
THATCHER B. DUNN,
G. W. KEYWORTH.